US012236193B1

(12) United States Patent
Kuperman et al.

(10) Patent No.: US 12,236,193 B1
(45) Date of Patent: Feb. 25, 2025

(54) AUTOMATED SELECTION OF LARGE LANGUAGE MODELS IN CLOUD COMPUTING ENVIRONMENTS

(71) Applicant: CAST AI Group, Inc., North Miami Beach, FL (US)

(72) Inventors: Leonid Kuperman, Toronto (CA); Žilvinas Urbonas, Vilnius (LT); Laurynas Stasys, Vilnius (LT); Kyrylo Yefimenko, Santo António da Serra (PT)

(73) Assignee: CAST AI Group, Inc., Miami, FL (US)

( * ) Notice: Subject to any disclaimer, the term of this patent is extended or adjusted under 35 U.S.C. 154(b) by 0 days.

(21) Appl. No.: 18/641,001

(22) Filed: Apr. 19, 2024

Related U.S. Application Data

(60) Provisional application No. 63/565,551, filed on Mar. 15, 2024.

(51) Int. Cl.
G10L 15/18 (2013.01)
G06F 40/284 (2020.01)
G06F 40/30 (2020.01)
G10L 15/16 (2006.01)
G10L 15/22 (2006.01)

(52) U.S. Cl.
CPC ............ G06F 40/284 (2020.01); G06F 40/30 (2020.01); G10L 15/16 (2013.01); G10L 15/18 (2013.01); G10L 15/1822 (2013.01); G10L 2015/223 (2013.01); G10L 2015/225 (2013.01)

(58) Field of Classification Search
None
See application file for complete search history.

(56) References Cited

U.S. PATENT DOCUMENTS

| 11,972,223 | B1* | 4/2024 | DeFoor ................... G06F 40/40 |
| 11,995,411 | B1* | 5/2024 | Qadrud-Din .......... G06F 40/289 |
| 12,001,462 | B1* | 6/2024 | Madisetti .............. G06F 40/284 |
| 2013/0166303 | A1* | 6/2013 | Chang ................. G06F 16/7834 |
| | | | 707/723 |
| 2021/0173829 | A1* | 6/2021 | Zeng ................. G06F 16/24524 |

(Continued)

FOREIGN PATENT DOCUMENTS

| CN | 112286644 | A | * | 1/2021 | ........... G06F 9/4451 |
| CN | 117609439 | A | * | 2/2024 | |

OTHER PUBLICATIONS

English translation of CN 112286644 A (Year: 2021).*

(Continued)

Primary Examiner — Richard Z Zhu
(74) Attorney, Agent, or Firm — Procopio, Cory, Hargreaves & Savitch LLP

(57) ABSTRACT

Systems or methods for the selection of large language models (LLMs). A system receives a request from a service that hosts an application. The request is configured to be processed by an LLM to generate a response. The system applies a classification model to the request to determine the class of the request. The classification model is a language model trained to receive text and classify the text into a plurality of classes. The system selects an LLM from a plurality of candidate LLMs based in part on the determined class of the request and recommends the selected LLM to the application.

18 Claims, 12 Drawing Sheets

(56) References Cited

U.S. PATENT DOCUMENTS

| | | | | |
|---|---|---|---|---|
| 2023/0135179 | A1* | 5/2023 | Mielke | G06N 5/022 |
| | | | | 704/232 |
| 2023/0237277 | A1* | 7/2023 | Reza | G06F 40/169 |
| | | | | 704/9 |
| 2023/0376841 | A1* | 11/2023 | Le | G06N 3/092 |
| 2024/0289632 | A1* | 8/2024 | Tan | G06N 3/092 |
| 2024/0296177 | A1* | 9/2024 | Gardner | G06F 40/216 |
| 2024/0303443 | A1* | 9/2024 | Cheng | G06N 3/0475 |
| 2024/0303473 | A1* | 9/2024 | Cheng | G06F 40/40 |
| 2024/0311405 | A1* | 9/2024 | Kim | G06F 16/3329 |

OTHER PUBLICATIONS

Toni Witt, "How to Understand, Manage Token-based pricing of generative AI Large Language models", Jul. 12, 2023. (Year: 2023).*

Suprabath Chakilam, "Fine-tuning vs. RAG: An opinion and comparative analysis", Nov. 9, 2023 (Year: 2023).*

Translation of CN117609439A (Year: 2024).*

\* cited by examiner

```
>>> why is the sky blue?
The sky appears blue due to a phenomenon called Rayleigh scattering. As sunlight
passes through Earth's atmosphere, it interacts with gas molecules and small
particles like dust and water droplets. Blue light has a shorter wavelength
compared to other colors in the visible spectrum (red, orange, yellow, green, blue,
indigo, violet). Due to this short wavelength, blue light is more easily scattered
than the other colors, which causes the sky to appear blue during the day.
```

Open-Source LLM Model Output
200A

FIG. 2A

ChatGPT

The sky appears blue due to a phenomenon called Rayleigh scattering. This involves understanding the nature of light and the atmosphere.

1. Nature of Light: Sunlight, which appears white, is actually a mixture of different colors of light. Each color has a different wavelength. Blue light has a shorter wavelength while red light has a longer wavelength.

2. Earth's Atmosphere: When sunlight enters the Earth's atmosphere, it collides with molecules and small particles in the air.

3. Scattering of Light: Due to Rayleigh scattering, shorter wavelengths of light (blue and violet) are scattered more efficiently by these air molecules than the longer wavelengths (such as red and yellow).

4. Human Vision and Atmospheric Effects: Although violet light is scattered more than blue, the sky does not appear violet because our eyes are more sensitive to blue light and because violet is largely absorbed by the upper atmosphere.

5. Directional Scattering: The scattered blue light is redirected in different directions, and some of this blue light reaches our eyes, making the sky look blue.

This explanation is based on the fundamental principles of physics and atmospheric science, relating to the interaction of light with the Earth's atmosphere.

Non-Open Source LLM Output 200B

FIG. 2B

| Tokenization method | Tokens | Token count | Vocab size |
|---|---|---|---|
| 510 Sentence | 'The moon, Earth's only natural satellite, has been a subject of fascination and wonder for thousands of years.' | 1 | # sentences in doc |
| 520 Word | 'The', 'moon,', "Earth's", 'only', 'natural', 'satellite,', 'has', 'been', 'a', 'subject', 'of', 'fascination', 'and', 'wonder', 'for', 'thousands', 'of', 'years.' | 18 | 171K (English[1]) |
| 530 Sub-Word | 'The', 'moon', ',', 'Earth', '"', "'", 's', 'on', 'ly', 'n', 'atur', 'al', 's', 'ate', 'll', 'it', 'e', ',', 'has', 'been', 'a', 'subject', 'of', 'fascinat', 'ion', 'and', 'w', 'on', 'd', 'er', 'for', 'th', 'ous', 'and', 's', 'of', 'y', 'ears', '.' | 37 | (varies) |
| 540 Character | 'T', 'h', 'e', ' ', 'm', 'o', 'o', 'n', ',', ' ', 'E', 'a', 'r', 't', 'h', ''', 's', ' ', 'o', 'n', 'l', 'y', ' ', 'n', 'a', 't', 'u', 'r', 'a', 'l', ' ', 's', 'a', 't', 'e', 'l', 'l', 'i', 't', 'e', ',', ' ', 'h', 'a', 's', ' ', 'b', 'e', 'e', 'n', ' ', 'a', ' ', 's', 'u', 'b', 'j', 'e', 'c', 't', ' ', 'o', 'f', ' ', 'f', 'a', 's', 'c', 'i', 'n', 'a', 't', 'i', 'o', 'n', ' ', 'a', 'n', 'd', ' ', 'w', 'o', 'n', 'd', 'e', 'r', ' ', 'f', 'o', 'r', ' ', 't', 'h', 'o', 'u', 's', 'a', 'n', 'd', 's', ' ', 'o', 'f', ' ', 'y', 'e', 'a', 'r', 's', '.' | 110 | 52 + punctuation (English) |

FIG. 5

OpenAI    Research ˅    API ˅    ChatGPT ˅    Safety    Company ˅         Search    Log in ↗    [Try ChatGPT ↗]

GPT-4 Turbo

610

With 128k context, fresher knowledge and the broadest set of capabilities, GPT-4 Turbo is more powerful than GPT-4 and offered at a lower price.

[Learn about GPT-4 Turbo ↗]

| Model | Input | Output |
|---|---|---|
| gpt-4-1106-preview | $0.01 / 1K tokens | $0.03 / 1K tokens |
| gpt-4-1106-vision-preview | $0.01 / 1K tokens | $0.03 / 1K tokens |

Vision Pricing calculator

[ 150 ] px by [ 150 ] px = $0.00255 ⊕

☐ Low resolution

GPT-4

620

With broad general knowledge and domain expertise. GPT-4 can follow complex instructions in natural language and solve difficult problems with accuracy.

[Learn about GPT-4 ↗]

| Model | Input | Output |
|---|---|---|
| gpt-4 | $0.03 / 1K tokens | $0.06 / 1K tokens |
| gpt-4-32k | $0.06 / 1K tokens | $0.12 / 1K tokens |

GPT-3.5 Turbo

630

GPT-3.5 Turbo models are capable and cost-effective.

gpt-3.5-turbo-1106 is the flagship model of this family, supports a 1K context window and is optimized for dialog.

gpt-3.5-turbo-instruct is an instruct model and only supports a 4K context window.

[Learn about GPT-3.5 Turbo ↗]

| Model | Input | Output |
|---|---|---|
| gpt-3.5-turbo-1106 | $0.0010 / 1K tokens | $0.0020 / 1K tokens |
| gpt-3.5-turbo-instruct | $0.0015 / 1K tokens | $0.0020 / 1K tokens |

FIG. 6

AUTOMATED SELECTION OF LARGE LANGUAGE MODELS IN CLOUD COMPUTING ENVIRONMENTS

CROSS-REFERENCE TO RELATED APPLICATIONS

This application claims the benefit of U.S. Provisional Application No. 63/565,551, filed Mar. 15, 2024, which is incorporated by reference in its entirety.

BACKGROUND

This disclosure relates generally to cloud computing and artificial intelligence (AI), and more specifically, automating selection of large language models (LLMs) in cloud computing environments.

Large Language Models (LLMs) such as the Generative Pre-trained Transformer (GPT) represent a significant advancement in artificial intelligence (AI) technology. These models are developed by training on extensive datasets comprising a wide range of text materials—from books and articles to websites and social media posts. This training process enables them to process human language, including grammar, context, and even cultural references. LLMs are able to perform a variety of tasks that were traditionally considered challenging for computers. These tasks include generating human-like text, translating languages, summarizing long pieces of content, answering questions, and more. The versatility of LLMs allows them to adapt to different styles and formats, making them valuable tools for content creation, educational purposes, and even technical applications like programming.

The adoption of LLMs is expected to grow, highlighting their potential to drive innovation, enhance efficiency, and introduce new capabilities across diverse fields. Their broad applicability and the ongoing advancements in AI research suggest that LLMs will continue to be at the forefront of technological progress.

However, one of the primary challenges in adopting LLMs is the associated cost. Operating these models requires substantial computational resources, especially for training and running complex queries. The pricing models for LLM services typically depend on the level of usage, which can be quantified in various ways, such as the number of API requests, the volume of text processed (measured in tokens or characters), or the amount of compute time utilized.

SUMMARY

Embodiments described herein solve the above-described problem by using a classification model to optimize the selection of large language models (LLMs). In some embodiments, a system receives a request from a service hosting an application. The request is configured to be processed by a LLM to generate a response. The system utilizes a classification model to classify the request into a specific class. This classification model is a language model trained to classify data examples into a variety of classes. The examples may include textual examples and/or multimodal examples, such as image, audio, and/or video. Based on the determined class of the request, the system selects an LLM from a plurality of candidate LLMs and recommends the selected LLM to the application. In some embodiments, the selected LLM is chosen because it can generate a sufficiently good response with the lowest cost for processing the request. The system then directs the request to the selected LLM, which generates a response. Upon receiving the response, the system forwards it to the application.

In some embodiments, the system is also configured to apply a similarity model to the prompt, identifying a set of historical requests similar to the current one. It then determines whether the request should be reconstructed to reduce a token count, which includes input and/or output token counts. If it is determined that the request should be reconstructed to reduce the token count, the system proceeds to reconstruct the request into an updated form. This reconstruction process may involve identifying a schema based on the set of historical prompts and reconstructing the request accordingly.

BRIEF DESCRIPTION OF THE DRAWINGS

FIG. 2A illustrates an example output of an LLM hosted on a Kubernetes network (e.g., 7B parameter LLM model), which is an open-source model in accordance with one or more embodiments.

FIG. 2B illustrates an example output of an LLM hosted on a SaaS platform (e.g., ChatGPT 4.0 model), which is a commercial proprietary model in accordance with one or more embodiments.

FIG. 5 illustrates a few example tokenization methods, including a sentence-based method, a word-based method, a sub-word-based method, and a character-based method, in accordance with one or more embodiments, FIG. 6 illustrates an example cost per thousand tokens for a plurality of LLMs, such as GPT-4 Turbo, GPT-4, and GPT-3.5 Turbo, in accordance with one or more embodiments.

Figure 1:
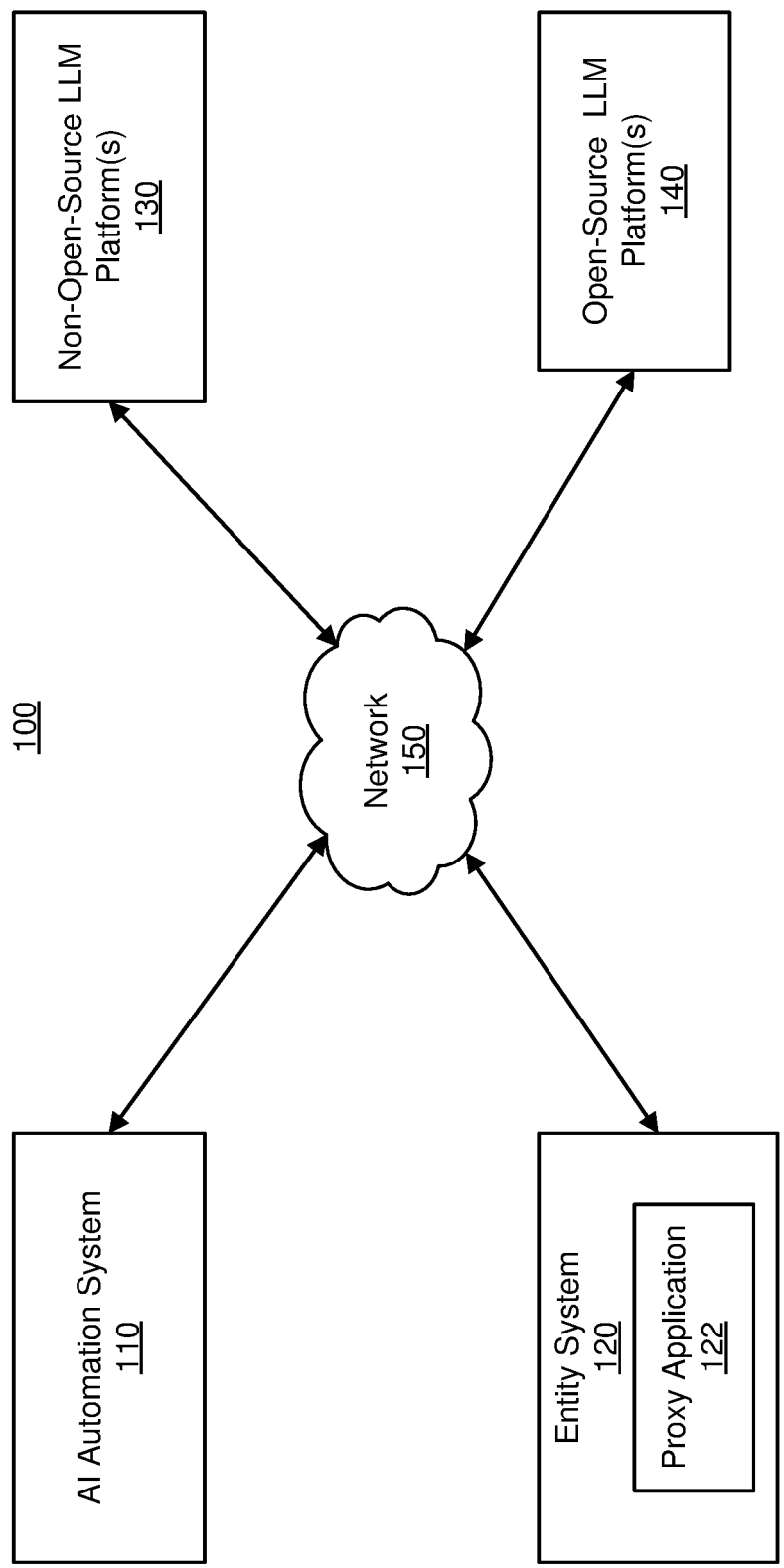
FIG. 1 is a block diagram of a system environment in which an AI automation system is configured to select an LLM for an entity system in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

The adoption of LLMs is expected to grow, highlighting their potential to drive innovation, enhance efficiency, and introduce new capabilities across diverse fields. Their broad applicability and the ongoing advancements in AI research suggest that LLMs will continue to be at the forefront of technological progress. However, one of the primary challenges in adopting LLMs is the associated cost. Operating these models requires substantial computational resources, especially for training and running complex queries. The pricing models for LLM services typically depend on the level of usage, which can be quantified in various ways, such as the number of API requests, the volume of text processed (measured in tokens or characters), or the amount of compute time utilized.

Embodiments described herein encompass an AI automation system that deploys a proxy application on entity systems. This proxy application sits between the entities' systems and Large Language Models (LLMs). It is configured to collect prompts sent from the entities' systems to LLMs, along with corresponding responses received from the LLMs, and send the collected data to the AI automation system. The AI automation system analyzes the collected data from the proxy application and extracts features associated with LLMs. These features include, but are not limited to, specific API keys, overall usage patterns, balance of input versus output tokens, and potential costs of model fine-tuning. Additionally, the AI automation system analyzes these features to determine performance metrics of different tasks performed by LLMs, aiding entities in achieving their AI-centric goals with reduced costs.

In some embodiments, the AI automation system is also configured to analyze and optimize system instructions, ensuring that prompts lead to more efficient token use and consequently lower overall costs. The automation system tracks API key costs and balances between input and output tokens in real-time, improving budget management and facilitating cost-saving decisions. Furthermore, it identifies use-cases where fine-tuning less expensive models is beneficial, reducing the need for more costly models and token usage while enhancing system efficiency. For instance, for large system prompts, the AI automation system may utilize LoRA fine-tuning techniques to embed prompt details into the model's weights, optimizing both performance and cost.

Additionally, in some embodiments, the AI automation system is further configured to time-slice GPUs and/or provide multi-instance GPU (MIG) device support. When an LLM model is deployed on a private Kubernetes (K8s) cluster, GPUs are utilized to their full extent. For example, if an entity runs the Llama 2 model on their private cluster on a Spot VM, there might be scenarios where the AI automation system determines that the GPU is not being fully utilized, such as at 70% of its capacity. In such cases, the AI automation system can split the GPU into two or more virtual GPUs and run two or more models side by side on the same GPU, resulting in nearly 100% utilization of the resource.

System Architecture

FIG. 1 is a block diagram of a system environment 100 in which an AI automation system 110 is configured to select an LLM for an entity system 120 in accordance with one or more embodiments. The environment 100 includes the AI automation system 110, one or more entity systems 120, one or more non-open-source SaaS platform(s) 130, and one or more open-source LLM platform(s) 140, which are configured to communicate with each other via a network 150. In alternative configurations, different and/or additional components may be included in the environment 100. In some embodiments, a task may be performed by a different component or a combination of multiple components.

The AI automation system 110 helps entity systems 120 intelligently select and route prompts to different LLM platforms 130, 140. In some embodiments, the AI automation system 110 causes a proxy application 122 to be deployed on each entity system 120. This proxy application 122 is configured to collect prompts generated by the entity system 120 and pass them to the AI automation system 110. Upon receiving a prompt, the AI automation system 110 determines the performance metrics of the multiple LLM platforms 130, 140. It then selects an LLM platform from the plurality of LLM platforms 130, 140 based on their performance metrics.

The one or more LLM SaaS platform(s) 130 may include (but are not limited to) non-open source LLMs, such as GPT-3, GPT-4, which are provided through APIs of a SaaS platform. The one or more open source LLM platform(s) 140 may include (but are not limited to) open source LLMs deployed on private Kubernetes (K8s). K8s is an open-source platform configured to automate deploying, scaling, and operating application containers. It groups containers that make up an application into logical units for easy management and discovery.

In some embodiments, the AI automation system 110 sends the selected LLM platform to the proxy application 122, causing the proxy application 122 to send the prompt to the selected LLM platform. Upon receiving the prompt, the selected LLM platform generates a response based on the prompt and sends the response back to the proxy application 122. Alternatively, the AI automation system 110 sends the prompt to the selected LLM platform. Upon receiving the prompt, the LLM platform 130 or 140 generates a response based on the prompt and sends this response back to the AI automation system 110, which in turn passes the response to the proxy application 122.

In some embodiments, the AI automation system 110 is configured to select a "good-enough" model at an optimal price per million tokens. Cost per million tokens is an example of a measure of cost-effectiveness when using Large Language Model (LLM) tooling in cloud environments, such as Software as a Service (SaaS) environments. Another example measure of cost-effectiveness, aside from SaaS environments, could be the cost per million API requests. Additionally, latency is another measure of how a system is performing at scale. For example, the computation of the cost for 1,000,000 tokens for GPT-4 would be: cost of 1,000,000 tokens=(1,000,000/1,000)×$0.03=$30.00. For Llama 2 (which is open source) on a Spot VM in Google Kubernetes Engine (GKE) (Instance Type: n1-standard-4 with an attached T4 GPU), the following cost may occur: Cost of 1,000,000 tokens=(1,000,000/1,000)×$0.001=$1.00. Notably, cost per million tokens for different LLM platforms may vary significantly.

The cost per one million tokens becomes a more significant issue depending on the type of application entities deploy. In a scenario where a job-based application runs once a day to execute tasks, spending $30 per million tokens might not be considered expensive. Conversely, in the case of an Ad Tech-based application that requires real-time calls at scale for ad placement, the cost formula and potential latency implications can disrupt the deployment model.

FIGS. 2A and 2B illustrate examples outputs of two different LLMs based on a same prompt, "why is the sky blue?" FIG. 2A illustrates an example output 200A of a 7B parameter LLM model, which is an open-source model. FIG. 2B illustrates an example output 200B of ChatGPT 4.0 model, which is a commercial proprietary model. As illustrated, the output of the two models are different but contain similar information. Depending on the purpose of the application, even though the output of ChatGPT4.0 is better, the output of the 7B parameter LLM model may be good enough; therefore, the AI automation system 110 may select the 7B parameter LLM model for the prompt.

Additional details about the AI automation system 110 are further described below with respect to FIGS. 3-4.

Figure 3:
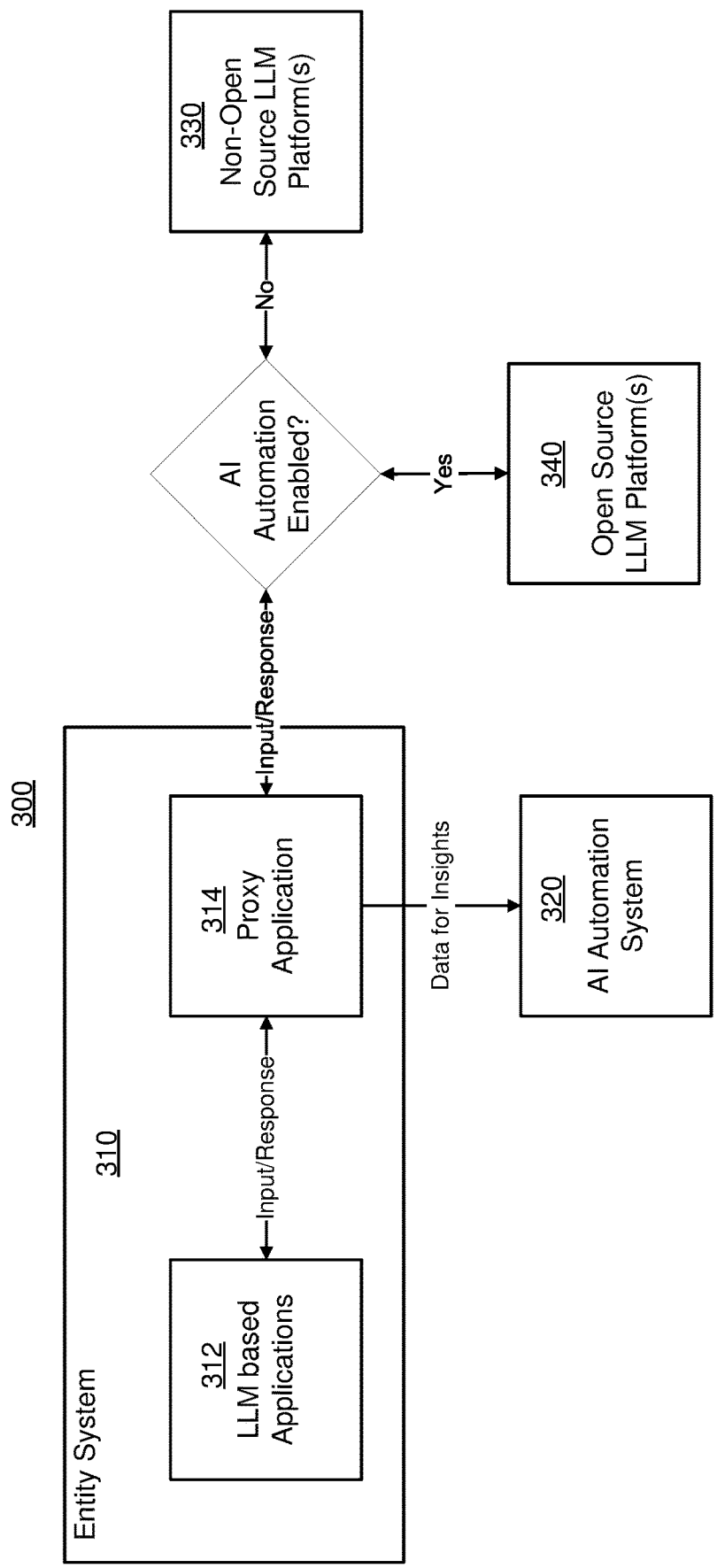
FIG. 3 is a block diagram of a system environment in which an AI Automation SaaS platform is configured to select an LLM platform for an LLM-based application of an entity system in accordance with one or more embodiments.

FIG. 3 is a block diagram of a system environment 300 in which an AI automation system 320 is configured to select an LLM platform for an LLM-based application 312 of an entity system 310 in accordance with one or more embodiments. The AI automation system 320 may correspond to the AI automation system 110 of FIG. 1. The environment 300 includes an entity system 310 that hosts one or more LLM based applications 312. The entity system 310 has an proxy application 314 installed thereon. In alternative configurations, different and/or additional components may be included in the environment 300.

The LLM based applications 312 is configured to generate prompts for the one or more LLM platforms 330, 340. The LLM platforms 330, 340, are configured to generate responses based on the prompts. The LLM based applications 312 then integrate the response generated by the LLM platforms 330, 340 into their workflows. These applications 312 can be found in various fields, including but not limited to, entity service (e.g., chatbots), content creation (e.g., article writing, code generation), education (e.g., tutoring systems, interactive learning platforms), and/or specialized areas like legal analysis or legal search, where the LLM platforms 330, 340 can help summarize legal documents or draft certain types of legal or technical descriptions in plain language. The flexibility and adaptability of LLMs make them powerful tools for enhancing productivity, improving accessibility to information, and automating repetitive tasks involving natural language processing and generation.

Conventional LLM based applications would generate and send prompts to the LLM platforms 330, 340 directly. Unlike the conventional technology, the embodiments described herein include the proxy application 314 between the LLM-based applications and the LLM platforms 330, 340. The LLM platforms 330, 340 include one or more non-open source LLM platforms 330 (such as OpenAI or similar platforms) and one or more open source LLM platforms, which may be deployed on private K8s OSS LLMs (such as Llama 2 or other models). The proxy application 314 is also configured to communicate with an AI automation system 320. In some embodiments, the proxy application 314 receives prompts from the LLM based applications and passes the prompts to the AI automation system 320. The AI automation system 320 analyzes each prompt to recommend an LLM platform that is suitable for processing the prompt. The AI automation system 320 sends the recommended LLM platform to the proxy application 314. The entity system 310 or the applications 312 can decide whether they would adopt the recommendation or not.

In some embodiments, the AI automation system 320 provides an API that allows entities or applications 312 to enable or disable 322 AI automation. When AI automation is enabled, the AI proxy application 314 automatically sends the prompt to the recommended LLM platform, causing the recommended LLM platform to process the prompt. When AI automation is disabled, the AI proxy application 314 simply informs the LLM-based applications 312 that there are recommended LLM platforms that may or may not be the same as the originally selected or default LLM selected by the LLM-based applications 312. Regardless of whether AI automation is enabled or disabled 322, the AI automation system 320 may generate analytical data to demonstrate to entities the resulting benefits or potential benefits of using the recommended LLM platforms, including performance metrics. If the entity or the application has not enabled AI automation, the potential benefits may encourage them to do so. In some embodiments, the applications 312 may determine to adopt or ignore the recommendation based on the specific benefit of using the recommended LLM.

Figure 4:
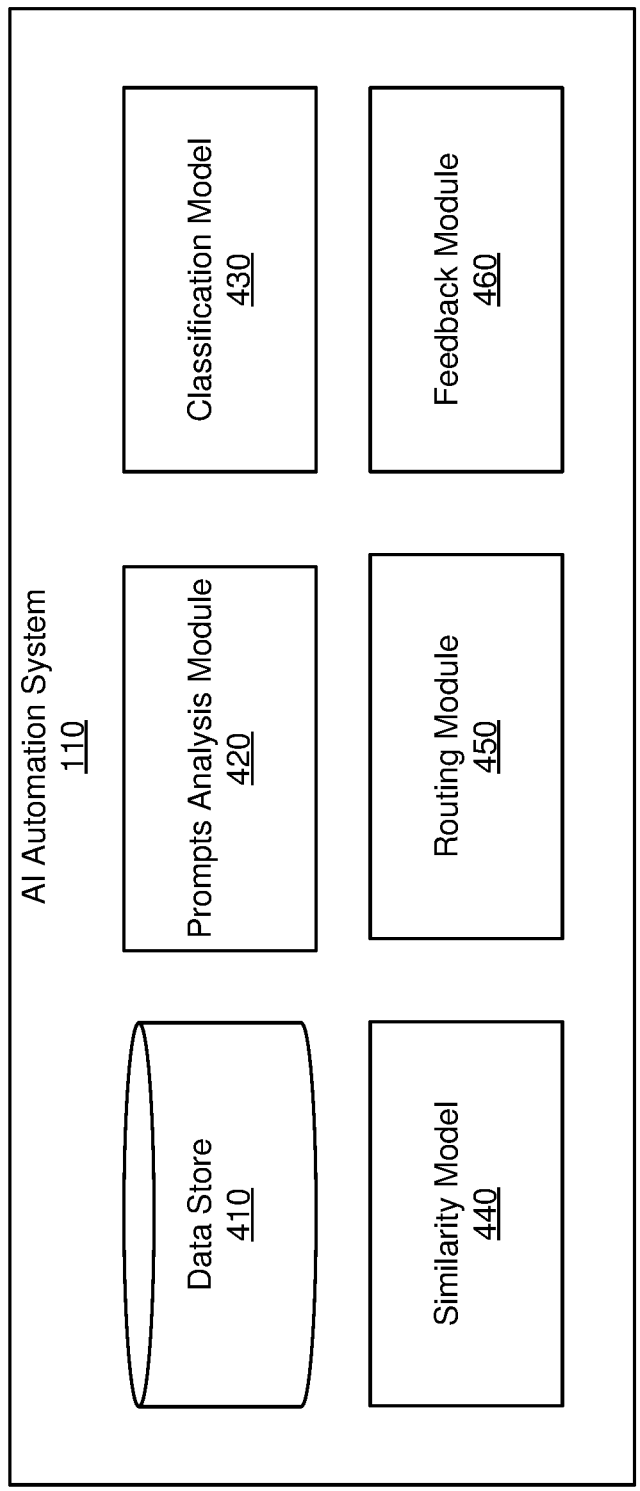
FIG. 4 illustrates an example architecture of the AI automation system in accordance with one or more embodiments.

FIG. 4 illustrates an example architecture of the AI automation system 110 in accordance with one or more embodiments. The AI automation system 110 includes a data store 410, a prompts analysis module 420, a classification model 430, a similarity model 440, a routing module 450, and a feedback module 460. In alternative configurations, different and/or additional components may be included in AI automation system 110.

In some embodiments, the AI automation system 110 is configured to collect prompts and corresponding responses from the LLM platforms 130, 140. The data store 410 may store collected historical prompts and other data associated with the historical prompts, such as (but not limited to) corresponding responses generated by LLMs, a token count associated with the prompt, a cost associated with the prompt, etc.

The prompts analysis module 420 is configured to analyze historical prompts and associated data. In some embodiments, the prompts analysis module 420 is configured to determine a token count for each of the prompt. The token count is a number of tokens in a prompt, which include individual units of text, such as words, subwords, or special tokens. The token count corresponds to complexity and specificity of the input given to the LLM. Also, a token count for a prompt depends on how the prompt is tokenized by a specific LLM being used. If the LLM tokenizes words and punctuation marks, the token count might be one number. However, if the LLM uses subword tokenization or includes special tokens, the token count would be a different number. Monitoring prompt token counts can help ensure that the input provided to the LLM is within the acceptable limits of the LLM's input capacity and does not exceed any constraints set by an application or environment in which the LLM is being used.

In some embodiments, the prompts analysis module 420 is also configured to analyze corresponding responses generated by LLMs. The prompts analysis module 420 may also be configured to determine a token count for each response. Similar to the prompt token count, the response token count includes a number of tokens. The response tokens also include individual units of text, such as words, subwords, or special tokens generated by the LLM. The response token count indicates the length or complexity of the response of the LLM. A higher response token count typically corresponds to a longer and more detailed response, while a lower response token count indicates a shorter or more concise response. Monitoring response token counts helps ensure that the generated response is of appropriate length and contains sufficient information relevant to the input prompt. Further, large token counts (prompt and/or response) may consume more computational resources and increase inference time, especially in online or real-time applications. As such, monitoring prompt or response token counts can help manage resource usage effectively.

FIG. 5 illustrates a few example tokenization methods 500, including a sentence-based method 510, a word-based method 520, a sub-word-based method 530, and a character-based method 540. As illustrated, for the same prompt or response "The moon, Earth's only natural satellite, has been a subject of fascination and wonder for thousands of years," a token count is 1 based on the sentence-based method 510, a token count is 18 based on the word-based method 520, a token count is 37 based on the sub-word-based method 530, and a token count is 110 based on the character-based method 540.

Some LLMs may support multimodal inputs, such as image input, audio input, or video input. When multimodal inputs are received, other tokenization methods may be applied. For example, when an image is received as an input, CNNs (convolutional neural networks) may be used to extract features from the image, and the extracted features may then be quantized into tokens. As another example, when an audio input is received, the audio input may be converted into text, or a spectrogram, which is then tokenized.

Notably, the costs of LLM services are often directly or indirectly related to token counts. FIG. 6 illustrates an example cost per thousand tokens for a plurality of LLMs, such as GPT-4 Turbo 610, GPT-4 620, and GPT-3.5 Turbo 630. As illustrated, the cost per thousand tokens are based on both a number of input tokens and output tokens, and different LLMs charge different amounts per thousand input/output tokens. Therefore, monitoring token counts can also help identify strategies to restructure certain types of prompts to reduce the token count. Additionally, it can help identify a particular LLM that is sufficiently good to provide a response with the lowest cost.

Figure 7:
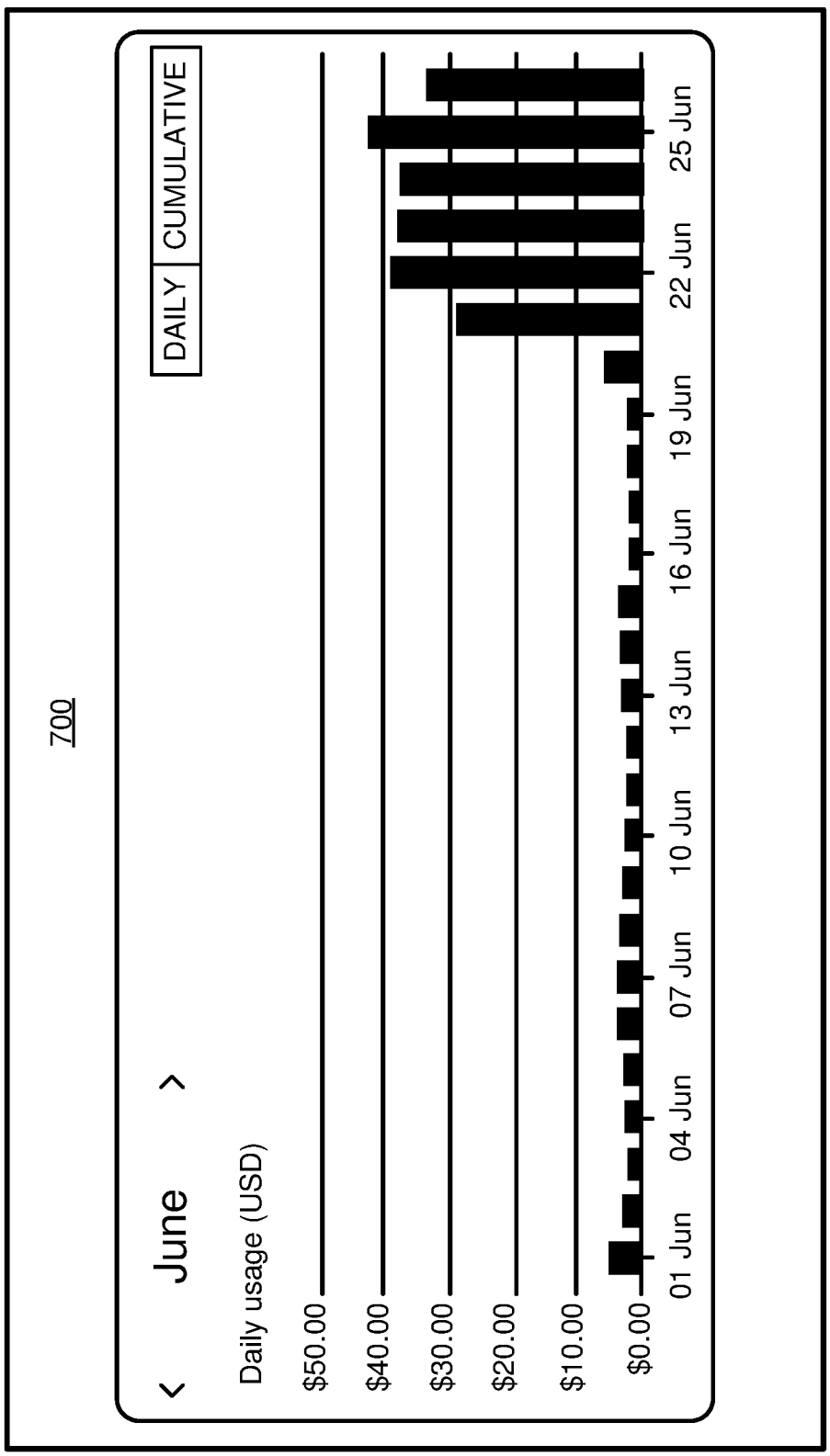
FIG. 7 illustrates an example GUI including a bar chart of a daily usage cost of LLMs in accordance with one or more embodiments.

In some embodiments, the prompts analysis module 420 may also be configured to track cost of LLMs for each entity, and present the tracked cost to the entity via a GUI. FIG. 7 illustrates an example GUI 700 including a bar chart of a daily usage of LLM costs. In some embodiments, the prompts analysis module 420 is also configured to identify anomalies based on the costs or token counts of prompts. As illustrated FIG. 7, the bar chart indicates a significant increase in costs since June 21. Such an increase in cost likely corresponds to increased token counts, which may be a result of a bug in application code that generates prompts. The prompts analysis module 420 may be configured to identify such types of anomalies and generate an alert to an administrator of the application.

In some embodiments, the AI automation system 110 is configured to train and apply one or more machine-learning models to the collected data to output results. In some embodiments, the one or more machine-learning models include a classification model 430 and/or a similarity model 440. The classification model 430 is a machine-learning model trained to receive a prompt and classify the prompt into one of a plurality of classes, such as medical, history, science or some other classes. Each class is associated with a particular LLM among the plurality of LLMs. In some embodiments, the AI automation system 110 is configured to select a "good-enough" model at an optimal price per million tokens.

Referring back to FIGS. 2A and 2B, the prompt is "why is the sky blue?" The classification model 430 may classify this prompt as a question related to science. The results of the same prompt for two different LLMs are similar, and the result from a lower cost or open-source LLM is sufficiently good. Thus, the lower-cost or open-source LLM is selected to process this type of prompt, e.g., questions related to science. However, when a prompt is classified as a medical question, a more sophisticated LLM (e.g., non-open-source LLM) may be selected, regardless of its costs. In some embodiments, each classification is mapped to a particular LLM. For example, the classification of science may be mapped to an open-source LLM, and the classification of medicine may be mapped to a non-open-source LLM.

In some embodiments, for each classification of prompts, the LLM compares responses from different LLMs to determine a similarity score. Responsive to determining that the similarity score is greater than a threshold, the AI automation system selects a lower-cost LLM for prompts in the classification. Otherwise, the AI automation system selects a higher-cost LLM for prompts in the classification. In some embodiments, for each classification of prompts, the LLM collects user feedback for responses generated by different LLMs. For each classification, a user satisfaction score is computed for each LLM. If a user satisfaction score is greater than a threshold for an open-source LLM, the open-source LLM is selected for the classification. Alternatively, the AI automation system compares satisfaction scores between different LLMs. If a difference between satisfaction scores for an open-source LLM and a non-open source LLM is smaller than a threshold, the open-source LLM is selected.

In some embodiments, the classification model 430 is a zero-shot classification model that can classify examples into classes that the model has never seen during training. Unlike traditional classifiers that are trained on labeled examples from all classes, zero-shot classification model can generalize to new classes based on their understanding of the relationships between classes or by leveraging additional information such as textual descriptions or attributes associated with the classes. This ability makes the zero-shot classification model particularly useful in scenarios where new classes may emerge over time or where it is impractical to collect labeled examples for all possible classes.

The similarity model 440 is a machine-learning model trained to receive a prompt and measure similarity or dissimilarity between the prompt and a historical prompt. In some embodiments, for a given prompt, the similarity model 440 identifies a set of historical prompts that are similar to the prompt. In some embodiments, the set of historical prompts is identified as being able to be restructured to reduce a token count. Such a prompt may be restructured using a prompt schema. A prompt schema is a structured format or template used to provide input to an LLM in order to elicit specific responses or perform certain tasks. It typically includes a combination of text prompts, special tokens, placeholders, and/or instructions configured to guide the LLM's generation process. For example, a schema may include a description that provides a brief overview or context for what the generated text should be about, a prompt that offers an initial input text or starting point for the LLM to build upon, an instruction that includes additional guidance or constraints for the LLM's generation process, such as tone, style, or content requirements, and/or an output length that indicates the desired length or size of the output.

In some embodiments, the schema may also include an SQL statement to obtain a dataset or constraints of a database. For example, in some embodiments, each historical prompt in the set includes a dataset that can be queried from a database. The schema may include an SQL query that references the dataset in the original prompt. Based on the set of historical prompt, the AI automation system 110 may generate an SQL query that references data in the prompt, integrates the SQL query into the schema to generate an updated prompt, and causes the updated prompt to be sent to the LLM to reduce the token count.

The feedback module 460 is configured to collect feedback from entities or users of applications responsive to receiving responses from LLMs. In some embodiments, the feedback may be in text format, and the feedback module 460 is configured to process the text format to determine the sentiment of the feedback to determine whether the users are satisfied or dissatisfied. In some embodiments, the feedback is a binary feedback, such as thumb up or down to indicate whether the users are satisfied or dissatisfied. In some embodiments, the AI automation system 110 is further configured to generate new training examples based on the feedback and retrain the classification model 430 and/or the similarity model based on the new training examples.

The routing module 450 is configured to apply the classification model 430 and similarity model 440 and select an LLM based on the result of the classification model 430 and/or similarity model 440. In some embodiments, the routing module 450 is configured to send the selected LLM to a corresponding application as a recommendation. In some embodiments, the routing model 450 is configured to send route the prompt or updated prompt to the selected LLM, causing the selected LLM to generate a response, and pass the response to the corresponding application.

Example Methods for Selecting an LLM or Updating a Prompt

Figure 8:
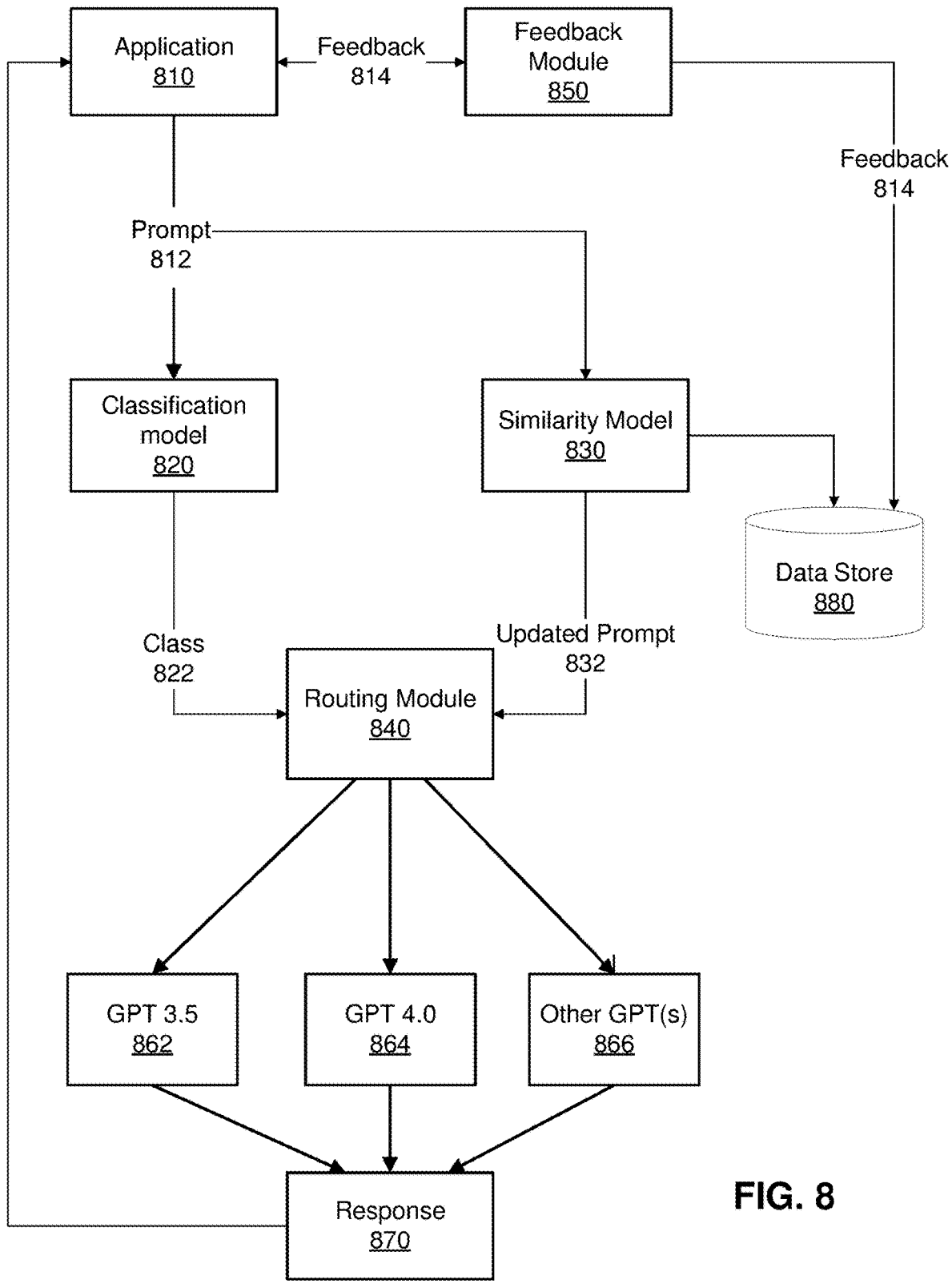
FIG. 8 illustrates an example process of selecting an LLM based on a prompt in accordance with one or more embodiments.

FIG. 8 illustrates an example process 800 of selecting an LLM based on a prompt in accordance with one or more embodiments. In alternative configurations, different and/or additional components may be included in the process 800. An application 810 may be an LLM-based application, corresponding to an LLM-based application 312 in FIG. 3. The application 810 is configured to generate a prompt 812. The prompt 812 is sent to a classification model 820 (corresponding to the classification model 430 in FIG. 4). The classification model 820 is a machine-learning model trained to classify prompts into a plurality of classes. Responsive to receiving the prompt 812, the classification model 820 classifies it into a class 822 among the plurality of classes. The class 822 is sent to a routing module 840 (corresponding to the routing module 450 in FIG. 4) configured to select a LLM based on the class.

Further, the prompt 812 is also sent to a similarity model 830 (corresponding to the similarity model 440 in FIG. 4). The similarity model 830 is a machine-learning model trained to determine a similarity between any given prompt and a historical prompt. Historical prompts are stored in a data store 880. Responsive to receiving the prompt 812, the similarity model 830 identifies a set of historical prompts that are similar to the prompt 812. The set of historical prompts is then used to determine whether the prompt should be updated to reduce a token count. Responsive to determining that the prompt should be updated, the similarity model 830 generates an updated prompt 832 and sends the updated prompt 832 to the routing module 840.

The routing module 840 then sends the prompt 812 or the updated prompt 832 to the selected LLM among a plurality of candidate LLMs 862, 864, 866. As illustrated, the plurality of candidate LLMs may include a GPT 3.5 862, GPT 4.0 864, and/or other GPTs 866. The other GPTs may be SaaS based like GPTs offered by OpenAI, or open source LLMs deployed on private K8s. The selected LLM receives the prompt 812 or updated prompt 832 and generates a response 870 based on the received prompt. The response 870 is sent back to the application 810. In some embodiments, the response 870 is directly sent from the selected LLM to the application 810. Alternatively, the response 870 is sent back to the routing module 840, which in turn passes the response 870 back to the application 810.

Upon receiving the response 870, a user of the application 810 may provide feedback 814 to a feedback module 850 (corresponding to the feedback module 460 in FIG. 4). In some embodiments, upon receiving feedback 814, the feedback module 850 may further process the feedback 814 to determine whether the feedback 814 is positive or negative. In some embodiments, feedback 814 is a binary feedback indicating whether it is positive or negative. The feedback module 850 sends the feedback 814 (which may or may not be further processed by the feedback module 850) to the data store 880, causing the data store 880 to store the feedback 814 relationally with the prompt 812 and the response 870.

Figure 9:
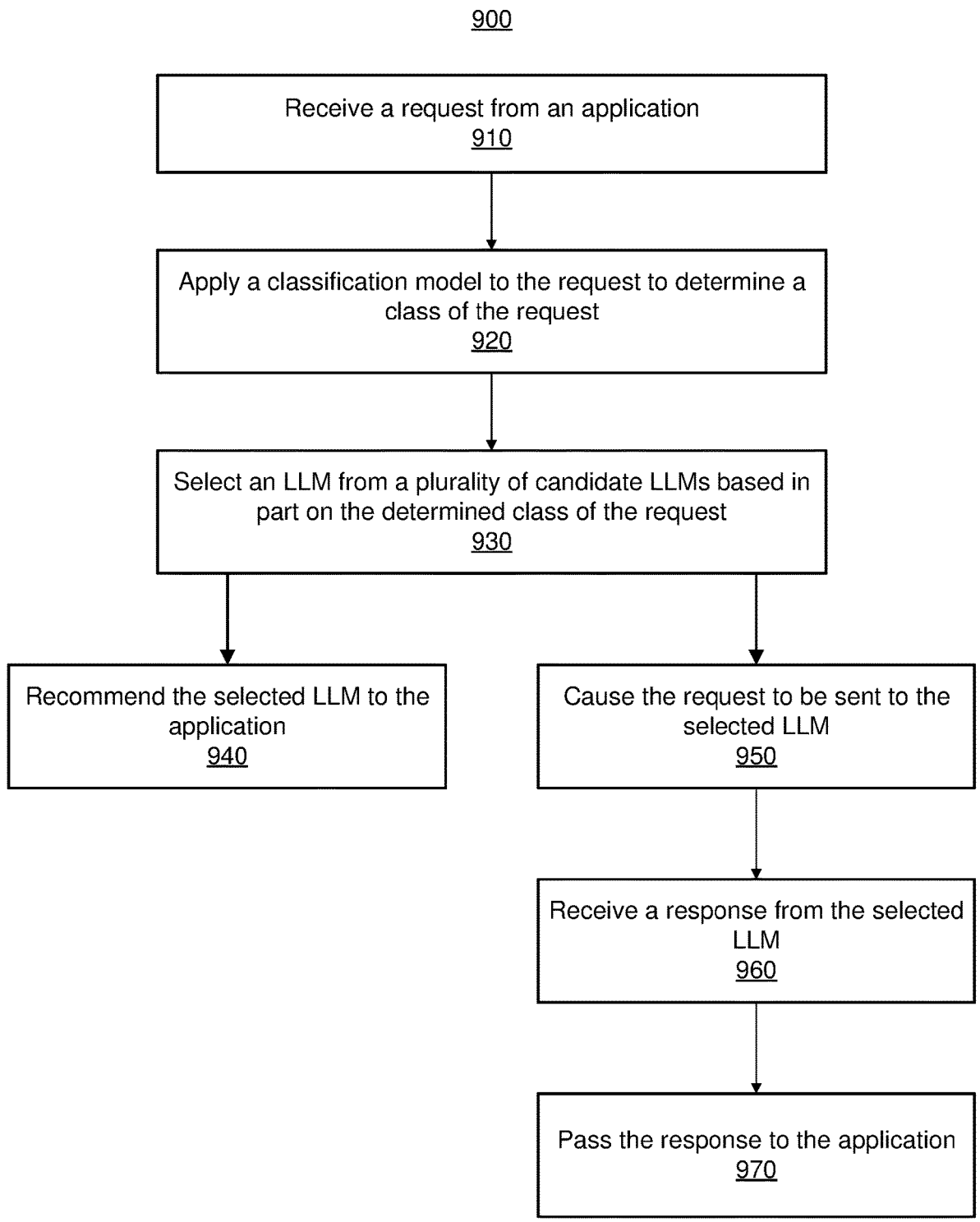
FIG. 9 is a flowchart of a method for selecting an LLM among a plurality of candidate LLMs based on a prompt in accordance with one or more embodiments.

FIG. 9 is a flowchart of a method 900 for selecting an LLM among a plurality of candidate LLMs based on a prompt in accordance with one or more embodiments. In various embodiments, the method includes different or additional steps than those described in conjunction with FIG. 9. Further, in some embodiments, the steps of the method may be performed in different orders than the order described in conjunction with FIG. 9. The method described in conjunction with FIG. 9 may be carried out by the AI automation system 110 in various embodiments, while in other embodiments, the steps of the method are performed by any online system capable of performing these steps.

The AI automation system 110 receives 910 a request from an application. The application may be a web application hosted at a service, which may be a part of an entity system. The application may be an LLM-based application configured to use an LLM to perform one or more tasks. The request includes a prompt served as input to elicit a response from an LLM.

The AI automation system 110 applies 920 a classification model to the request to determine a class of the request. In some embodiments, the classification model is a machine-learning model trained to receive data examples and classify the data examples into one of a plurality of classes. In some embodiments, the classification model is a zero-shot language model configured to classify examples into classes that the model has never seen during training. In some embodiments, the classification model is a one-shot language model configured to classify examples into classes when presented with only one example of each class. The classification model receives the request and classifies the request into one of a plurality of classes, such as medical, history, science, etc. In some embodiments, the LLMs include a LLM that supports multimodal inputs, such as images, voice, or video. In some embodiments, the classification model or an additional classification model is trained to process multimodal data and classify the multimodal data into one of the plurality of classes. In some embodiments, the classification model or an additional classification model is trained to process image data, classifying received image data into one of the plurality of classes. In some embodiments, the classification model or an additional classification model is trained to process audio data, classifying the received audio data into one of the plurality of classes.

The AI automation system 110 selects 930 an LLM from a plurality of candidate LLMs based in part on the determined class of the request. In some embodiments, each of the plurality of classes corresponds to a particular LLM, and the AI automation system 110 selects the LLM corresponding to the determined class of the request. In some embodiments, the selection of the LLM is based on whether each of the LLMs is able to generate a sufficiently good response, and an LLM that can generate a sufficiently good response with the lowest cost is selected.

In some embodiments, AI automation system 110 recommends 940 the selected LLM to the application. When the recommended LLM differs from the originally selected LLM in an application (or a default LLM), the application may determine whether the request should be sent to the default LLM or the recommended LLM. In some embodiments, the AI automation system 110 includes benefits of using the selected LLM in the recommendation, such as potential savings or lower latency, among other factors. This enables the application to determine whether the request should be sent to the recommended LLM based on these benefits.

In some embodiments, the AI automation system 110 causes 950 the request to be sent to the selected LLM. In some embodiments, the AI automation system 110 may offer applications an option to enable or disable AI automation. When the AI automation option is enabled, the AI automation system 110 causes the request to be sent to the selected LLM automatically. Upon receiving the request, the selected LLM generates a response, responding to the request. On the other side, the AI automation system 110 receives 960 the response from the selected LLM 960 and passes 970 the response to the application.

Figure 10:
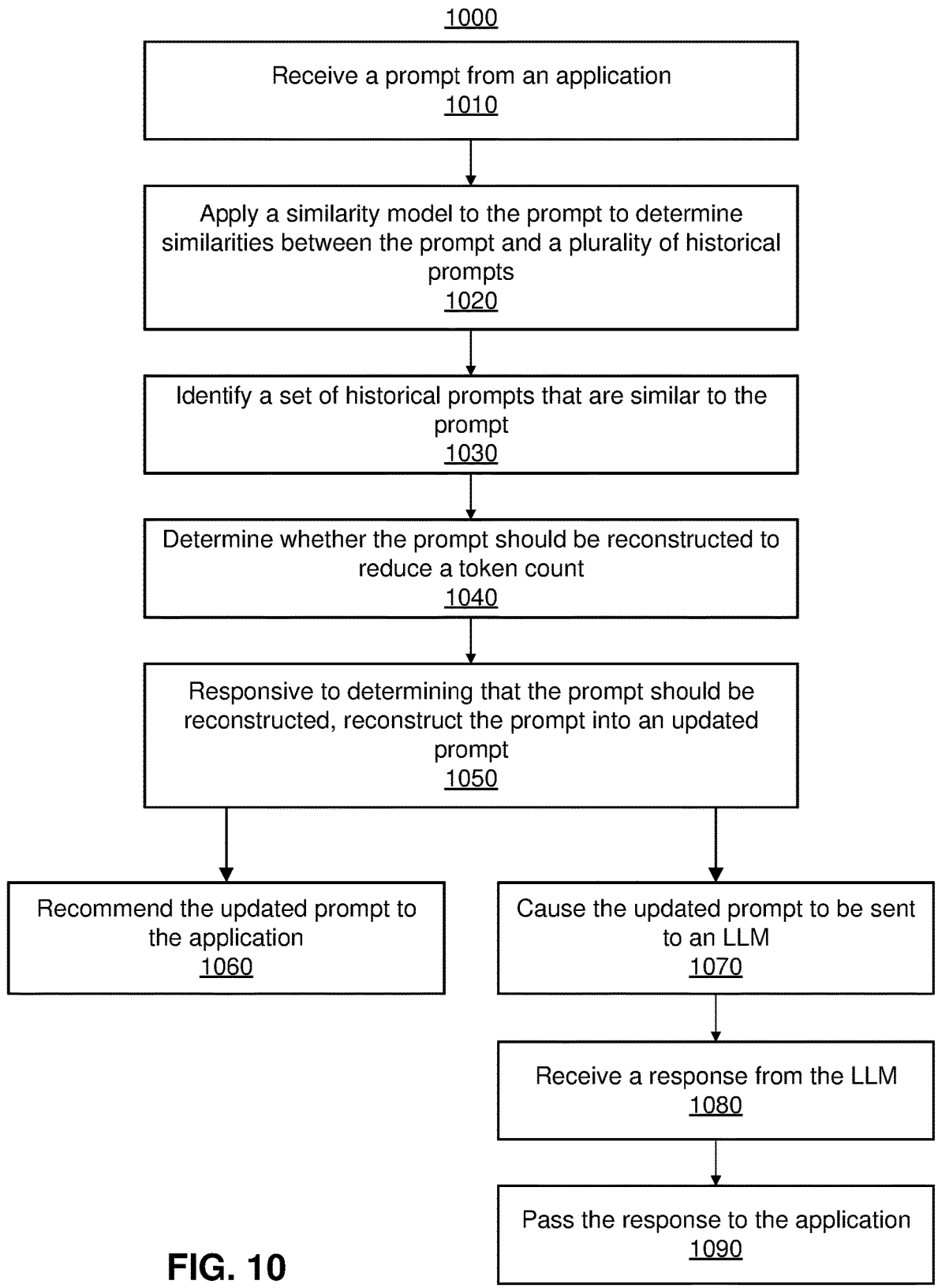
FIG. 10 is a flowchart of a method for updating a prompt for an LLM to reduce token count in accordance with one or more embodiments.

FIG. 10 is a flowchart of a method 1000 for updating a prompt for an LLM to reduce token count in accordance with one or more embodiments. In various embodiments, the method includes different or additional steps than those described in conjunction with FIG. 10. Further, in some embodiments, the steps of the method may be performed in different orders than the order described in conjunction with FIG. 10. The method described in conjunction with FIG. 10 may be carried out by the AI automation system 110 in various embodiments, while in other embodiments, the steps of the method are performed by any online system capable of performing these steps.

The AI automation system 110 receives 1010 a prompt from an application. The application may be a web application hosted at a service, which may be a part of an entity system. The application may be an LLM-based application configured to use an LLM to perform one or more tasks. The prompt serves as input to elicit a response from an LLM. In some embodiments, the LLM is selected by the application. Alternatively, the LLM is selected by the AI automation system 110. The method of selecting an LLM from a plurality of candidate LLMs is described above with respect to FIG. 9.

The prompt The AI automation system 110 applies 1020 a similarity model to the prompt to determine similarities between the prompt and a plurality of historical prompts. The AI automation system 110 identifies 1030 a set of historical prompts that are similar to the prompt. In some embodiments, the similarity model is configured to determine a similarity score between the prompt and each historical prompt, aiming to identify a set of one or more historical prompts with the highest similarity scores. Additionally, the similarity model may be set to determine similarity scores between the prompt and historical prompts until a set of one or more historical prompts with scores higher than a defined threshold are identified.

The AI automation system 110 determines 1040 whether the prompt should be reconstructed to reduce a token count. In some embodiments, the token count may include both an input token count and an output token count. The token count represents the number of tokens in a prompt or a response, encompassing individual units of text such as words, subwords, or special tokens. This count reflects the complexity and specificity of the input given to the LLM or the response generated by the LLM. Moreover, the token count depends on how the prompt is tokenized by the specific LLM being used. For instance, if the LLM tokenizes words and punctuation marks, the token count might be one number. However, if the LLM uses subword tokenization or includes special tokens, the token count would be a different number. In some embodiments, the AI automation system 110 determines a token count for each of the identified historical prompts and their corresponding responses. It then assesses whether the prompt should be reconstructed to reduce the token count based on the token counts of the identified historical prompts and their corresponding responses.

Responsive to determining that the prompt should be reconstructed to reduce the token count, the AI automation system 110 reconstructs 1050 the prompt into an updated prompt. In some embodiments, the set of identified historical prompts corresponds to a prompt schema. The prompt is reconstructed based on the prompt schema. A prompt schema is a structured format or template used to provide input to an LLM in order to elicit specific responses or perform certain tasks. It typically includes a combination of text prompts, special tokens, placeholders, and/or instructions configured to guide the LLM's generation process. For example, a schema may include a description that provides a brief overview or context for what the generated text should be about, a prompt that offers an initial input text or starting point for the LLM to build upon, an instruction that includes additional guidance or constraints for the LLM's generation process, such as tone, style, or content requirements, and/or an output length that indicates the desired length or size of the output. In some embodiments, the schema may also include an SQL statement to obtain a dataset or constraints of a database. For example, in some embodiments, each historical prompt in the set includes a dataset that can be queried from a database. The schema may include an SQL query that references the dataset in the original prompt. Based on the set of historical prompt, the AI automation system 110 may generate an SQL query that references data in the prompt, integrates the SQL query into the schema to generate an updated prompt, and causes the updated prompt to be sent to the LLM to reduce the token count.

In some embodiments, the AI automation system 110 recommends 1060 the updated prompt to the application. In some embodiments, The recommendation also includes a calculation of the number of tokens that may be reduced by using the updated prompt compared to the original prompt. The application may determine to use the updated prompt or the original prompt based on the recommendation.

In some embodiments, the AI automation system 110 causes 1070 the updated prompt to be sent to an LLM. In some embodiments, the AI automation system 110 may offer applications an option to enable or disable AI automation. When the AI automation is enabled, the AI automation system 110 causes 1070 the updated prompt to be sent to the LLM automatically. Upon receiving the updated prompt, the LLM generates a response responding to the updated prompt. On the other side, the AI automation system 110 receives 1080 the response from the LLM and passes 1090 the response to the application.

In some embodiments, the AI automation system 110 is further configured to determine a GPU utilization rate at a private Kubernetes that host an open source LLM. Responsive to determining that the GPU utilization rate is lower than a predetermined threshold, e.g., 70%, the AI automation system 110 causes the GPU to be divided into a plurality of virtual GPUs, and causes each of the plurality of virtual GPUs to execute a separate instance of the open source LLM, such that the GPU utilization rate can be increased to near 100%.

Example Computing System

Figure 11:
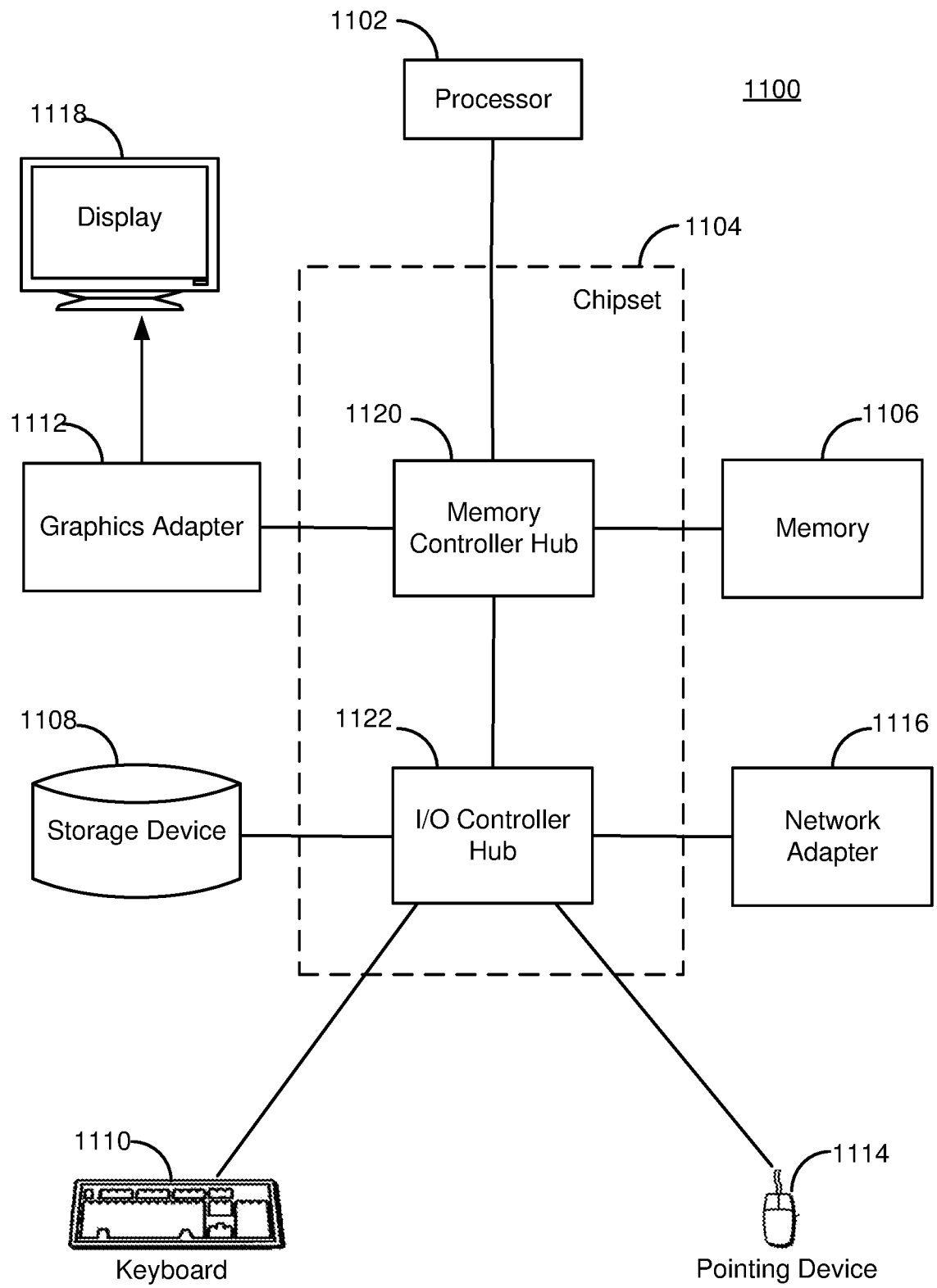
FIG. 11 is a block diagram of an example computer suitable for use in the networked computing environment of FIG. 1.

FIG. 11 is a block diagram of an example computer 1100 suitable for use in the networked computing environment 100 of FIG. 1. The computer 1100 is a computer system and is configured to perform specific functions as described herein. For example, the specific functions corresponding to AI automation system 110 or LLM platforms 130, 140 may be configured through the computer 1100.

The example computer 1100 includes a processor system having one or more processors 1102 coupled to a chipset 1104. The chipset 1104 includes a memory controller hub 1120 and an input/output (I/O) controller hub 1122. A memory system having one or more memories 1106 and a graphics adapter 1112 are coupled to the memory controller hub 1120, and a display 1118 is coupled to the graphics adapter 1112. A storage device 1108, keyboard 1110, pointing device 1114, and network adapter 1116 are coupled to the I/O controller hub 1122. Other embodiments of the computer 1100 have different architectures.

In the embodiment shown in FIG. 11, the storage device 1108 is a non-transitory computer-readable storage medium such as a hard drive, compact disk read-only memory (CD-ROM), DVD, or a solid-state memory device. The memory 1106 holds instructions and data used by the processor 1102. The pointing device 1114 is a mouse, track ball, touchscreen, or other types of a pointing device and may be used in combination with the keyboard 1110 (which may be an on-screen keyboard) to input data into the computer 1100. The graphics adapter 1112 displays images and other information on the display 1118. The network adapter 1116 couples the computer 1100 to one or more computer networks, such as network 150.

The types of computers used by the entities and the AI automation system 110 of FIGS. 1 through 10 can vary depending upon the embodiment and the processing power required by the enterprise. For example, the AI automation system 110 might include multiple blade servers working together to provide the functionality described. Furthermore, the computers can lack some of the components described above, such as keyboards 1110, graphics adapters 1112, and displays 1118.

Additional Considerations

The AI automation system 110 described herein collects and analyzes data associated with prompts to, and responses from, Large Language Models (LLMs), including associated metadata. The AI automation system 110 uses this collected data to train machine learning models. These machine-learning models are trained to intelligently select and route prompts from applications to different LLMs to achieve desired performance metrics and reduce operational costs. Furthermore, the AI automation system 110 is capable of dynamically adjusting computational resources, such as GPU utilization, to further enhance operational efficiency.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcodes, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for selection of Large Language Models (LLMs), the method comprising:
  receiving a request from a service that hosts an application, wherein the request is configured to be processed by an LLM to generate a response;
  applying a classification model to the request to determine a class of the request, wherein the classification model is trained to receive data examples and classify the data examples into a plurality of classes;
  selecting an LLM from a plurality of candidate LLMs based at least in part on the determined class of the request; and
  recommending the selected LLM to the application,
  wherein the plurality of candidate LLMs comprise a first LLM hosted on an open source platform having a first user feedback score derived from the determined class of the request, and a second LLM hosted on a non-open source platform having a second feedback score derived from the determined class of the request,
wherein the selecting the LLM from the plurality of candidate LLMs comprises:
for a difference between the first user feedback score and the second user feedback score being less than a threshold, selecting the first LLM as the LLM, and
for the difference being equal to or greater than the threshold, selecting the second LLM as the LLM.

2. The method of claim 1, wherein the classification model is a zero-shot classification model trained to classify requests into classes.

3. The method of claim 1, further comprising:
determining a number of tokens required for at least one of the plurality of candidate LLMs to process the request; and
selecting the LLM from the plurality of LLMs further based on the number of tokens.

4. The method of claim 1, further comprising: for the second LLM being selected as the LLM, performing:
determining a GPU utilization rate at a private Kubernetes network that hosts the second LLM;
responsive to determining that the GPU utilization rate is lower than a predetermined threshold,
causing the GPU to be divided into a plurality of virtual GPUs; and
causing each of the plurality of virtual GPUs to execute a separate instance of the second LLM.

5. The method of claim 1, further comprising:
causing the request to be sent to the selected LLM;
receiving a response from the selected LLM; and
passing the response to the application.

6. The method of claim 5, wherein the request comprises a first prompt in a first format, the method further comprising:
constructing a second prompt in a second format; and
sending the second prompt to the selected LLM.

7. The method of claim 6, further comprising:
applying a similarity model to the first prompt to determine similarities between the first prompt and a plurality of historical prompts received from applications;
identifying a set of historical prompts that are similar to the first prompt;
identifying a prompt schema associated with the set of historical prompts; and
applying the prompt schema to the first prompt to generate the second prompt that corresponds to a lower token count than the first prompt.

8. The method of claim 7, wherein applying the prompt schema to the first prompt comprises:
generating an SQL query that references data in the first prompt, and
integrating the SQL query into the schema to generate the second prompt.

9. A non-transitory computer readable storage medium having instructions encoded thereon that, when executed by one or more processors, cause the one or more processors to:
receive a request from a service that hosts an application, where the request is configured to be processed by an LLM to generate a response;
apply a classification model to the request to determine a class of the request, wherein the classification model trained to receive examples and classify the examples into a plurality of classes;
select an LLM from a plurality of candidate LLMs;
recommend the selected LLM to the application,
wherein the plurality of candidate LLMs comprise a first LLM hosted on an open source platform having a first user feedback score derived from the determined class of the request, and a second LLM hosted on a non-open source platform having a second feedback score derived from the determined class of the request,
wherein the selecting the LLM from the plurality of candidate LLMs comprises:
for a difference between the first user feedback score and the second user feedback score being less than a threshold, selecting the first LLM as the LLM, and
for the difference being equal to or greater than the threshold, selecting the second LLM as the LLM.

10. The non-transitory computer readable storage medium of claim 9, wherein the classification model is a zero-shot classification model trained to classify requests into classes.

11. The non-transitory computer readable storage medium of claim 9, the one or more processors are further caused to:
determine a number of tokens required for at least one of the plurality of candidate LLMs to process the request; and
select the LLM from the plurality of LLMs further based on the number of tokens.

12. The non-transitory computer readable storage medium of claim 9, wherein the one or more processors are further caused to:
for the selected LLM being non-open-source, perform:
determine a GPU utilization rate at a private Kubernetes network that host the second LLM;
responsive to determining that the GPU utilization rate is lower than a predetermined threshold,
cause the GPU to be divided into a plurality of virtual GPUs; and
cause each of the plurality of virtual GPUs to execute a separate instance of the second LLM.

13. The non-transitory computer readable storage medium of claim 12, wherein the one or more processors are further caused to:
cause the request to be sent to the selected LLM;
receive a response from the selected LLM; and
pass the response to the application.

14. The non-transitory computer readable storage medium of claim 13, wherein the request comprises a first prompt in a first format, and the one or more processors are further configured to:
construct a second prompt in a second format; and
send the second prompt to the selected LLM.

15. The non-transitory computer readable storage medium of claim 14, wherein the one or more processors are further configured to:
apply a similarity model to the first prompt to determine similarities between the first prompt and a plurality of historical prompts received from applications;
identify a set of historical prompts that are similar to the first prompt;
identify a prompt schema associated with the set of historical prompts; and
applying the prompt schema to the first prompt to generate the second prompt that corresponds to a lower token count than the first prompt.

16. The non-transitory computer readable storage medium of claim 15, wherein applying the prompt schema to the first prompt comprises:
generating an SQL query that references data in the first prompt, and integrating the SQL query into the schema to generate the second prompt.

17. A computing system, comprising:
one or more processors; and
a non-transitory computer readable storage medium having instructions encoded thereon that, when executed by the one or more processors, cause the one or more processors to:
  receive a request from a service that hosts an application, where the request is configured to be processed by an LLM to generate a response;
  apply a classification model to the request to determine a class of the request, wherein the classification model is trained to receive examples and classify the examples into a plurality of classes;
  select an LLM from a plurality of candidate LLMs based at least in part on the determined class of the request; and
  recommend the selected LLM to the application,
  wherein the plurality of candidate LLMs comprise a first LLM hosted on an open source platform having a first user feedback score derived from the determined class of the request, and a second LLM hosted on a non-open source platform having a second feedback score derived from the determined class of the request,
  wherein the selecting the LLM from the plurality of candidate LLMs comprises:
  for a difference between the first user feedback score and the second user feedback score being less than a threshold, selecting the first LLM as the LLM, and
  for the difference being equal to or greater than the threshold, selecting the second LLM as the LLM.

18. The computing system of claim 17, wherein the classification model is a zero-shot classification model trained to classify requests into classes.

* * * * *